US012502607B2

(12) United States Patent
Gates

(10) Patent No.: US 12,502,607 B2
(45) Date of Patent: Dec. 23, 2025

(54) DYNAMIC VOLUME ADJUSTMENT BASED ON A PLAYER'S FORWARD VECTOR RELATIVE TO AN AUDIO SOURCE IN A VIRTUAL WORLD

(71) Applicant: VRChat Inc., San Francisco, CA (US)

(72) Inventor: Samuel Gates, Durham, ME (US)

(73) Assignee: VRCHAT INC., San Francisco, CA (US)

( * ) Notice: Subject to any disclaimer, the term of this patent is extended or adjusted under 35 U.S.C. 154(b) by 257 days.

(21) Appl. No.: 18/485,345

(22) Filed: Oct. 12, 2023

(65) Prior Publication Data

US 2025/0121285 A1 Apr. 17, 2025

(51) Int. Cl.
*A63F 13/54* (2014.01)

(52) U.S. Cl.
CPC ...... *A63F 13/54* (2014.09); *A63F 2300/6063* (2013.01); *A63F 2300/6081* (2013.01)

(58) Field of Classification Search
CPC .............. A63F 13/54; A63F 2300/6063; A63F 2300/6081
USPC ........................................................... 463/35
See application file for complete search history.

(56) References Cited

U.S. PATENT DOCUMENTS

| | | | | |
|---|---|---|---|---|
| 10,976,991 B2 * | 4/2021 | Robinson | H04R 25/50 |
| 11,190,899 B2 * | 11/2021 | Stringer | H04S 5/005 |
| 11,671,756 B2 * | 6/2023 | Tourbabin | G10L 15/28 367/127 |
| 2023/0285859 A1 * | 9/2023 | Zhou | A63F 13/54 |

* cited by examiner

*Primary Examiner* — Allen Chan
(74) *Attorney, Agent, or Firm* — Polsinelli PC

(57) ABSTRACT

The present technology provides a more natural audio experience in a virtual world. In particular, the present technology provides an inner cone around a local player where audio sources within the inner cone are presented at full volume and an outer cone where audio sources outside the outer cone are presented at a minimum volume, or not at all. Audio sources that originate between the inner cone and outer cone are scaled based on their distance between the inner cone and outer cone. The present technology also provides a spatial aspect by shaping the inner cone and outer cone based on the forward vector of the local player so that more sounds are audible that are in front of the local player and less sounds behind the local player are audible.

20 Claims, 11 Drawing Sheets

DYNAMIC VOLUME ADJUSTMENT BASED ON A PLAYER'S FORWARD VECTOR RELATIVE TO AN AUDIO SOURCE IN A VIRTUAL WORLD

BACKGROUND

In virtual worlds sound from audio sources tends to propagate in all directions equally. In some virtual worlds, all sounds originating within the virtual world can be audible to the local player. This means that the local player might experience sounds from conversations that are not occurring with the local player's field of view.

One solution to this problem is to reduce audio sources heard by the local player to only those sources that are originating around the local player. However, this can still be disorienting in a crowded area of a virtual world because the sound comes from all audio sources around a local player equally. This can make it hard for a local player to focus on a particular audio source or subset of audio sources.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
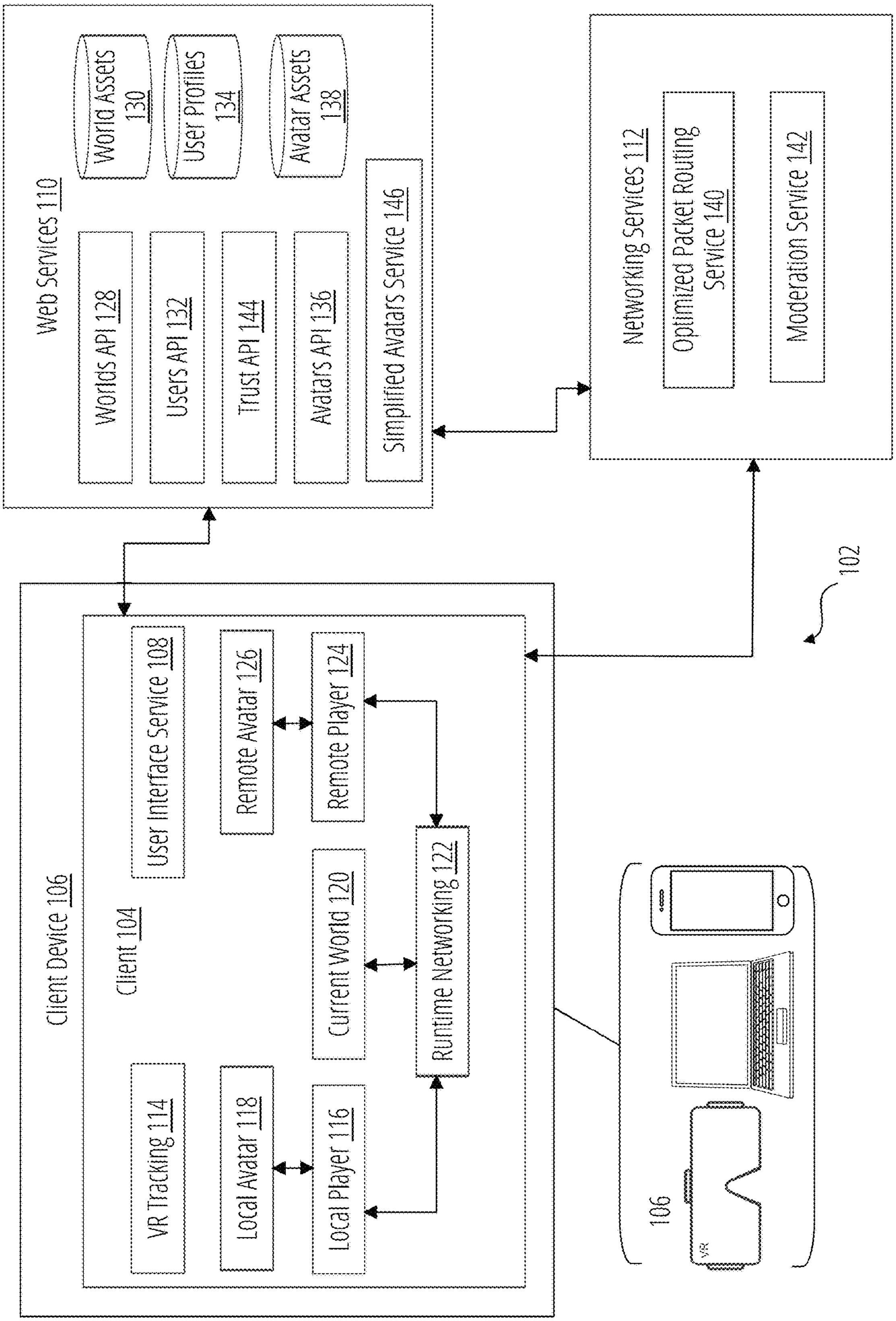
FIG. 1 illustrates an example virtual world platform for playing and hosting a multiplayer virtual reality (VR) experience in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology pertains to dynamically adjusting the volume of an audio source around a local player based on the local player's forward vector relative to the audio source in a virtual world.

Generally, in virtual worlds sound from audio sources tends to propagate in all directions equally. In some virtual worlds, all sounds originating within the virtual world can be audible to the local player. This means that the local player might experience sounds from conversations that are not occurring with the local player's field of view.

One solution to this problem is to reduce audio sources heard by the local player to only those sources that are originating around the local player. However, this can still be disorienting in a crowded area of a virtual world because the sound comes from all audio sources around a local player equally. This can make it hard for a local player to focus on a particular audio source or subset of audio sources.

For example, when an audio source is behind a local player, the local player can hear the audio source that is behind the local player just as well as another audio source that might be in front of the local player. While this might match the physics of sound propagation, this does not provide a realistic sound experience to the human controlling the local player who is used to hearing sounds through their ears, which are shaped to distinguish between sounds in front of them and behind them. Because of the shape of human ears, sounds from behind or from the sides are less loud than sounds originating in front of them.

Accordingly, the current methods of regulating sounds reaching a local player are both disorienting and do not feel realistic. The present technology brings a directional component to sounds in a virtual world.

The directional nature of sound in a virtual world is not the only problem. Another problem is that sounds tend to be present or not present in a virtual world. For example, if a virtual world filters sounds that will reach a local player by a distance threshold relative to the local player, an audio source will not be audible when the audio source is beyond the distance threshold, and then when the audio source, such as a remote player, comes within the distance threshold their audio is delivered to the local player at full volume. This is also not realistic.

Accordingly, the present technology provides a solution to this problem by scaling an audio source's volume as it gets nearer to the local player. Additionally, the direction of approach is also accounted for such that an audio source's volume might increase more slowly or quickly when approaching from different directions. This behavior of the present technology avoids startling a local player when a remote player's voice suddenly becomes audible and can help a local player become aware when other players that the local player is not directly facing approach and try to engage the local player in conversation.

In total the present technology provides a more natural audio experience. In particular, the present technology provides an inner cone where audio sources within the inner cone are presented at full volume and an outer cone where audio sources outside the outer cone are presented at a minimum volume, or not at all. Audio sources that originate between the inner cone and outer cone are scaled based on their distance between the inner cone and outer cone.

The present technology also provides a spatial aspect by shaping the inner cone and outer cone based on the forward vector of the local player so that more sounds are audible that are in front of the local player and less sounds behind the local player are audible.

FIG. 1 illustrates an example virtual world platform 102 for playing and hosting a multiplayer virtual reality (VR) experience that is suited to carrying out the present technology. The virtual world platform 102 can connect clients 104 through web services 110 and networking services 112 to socially interact together in a virtual world hosted by virtual world platform 102.

The virtual world platform 102 primarily includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual world. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first person inputs from a user of the client device 106 upon which client 104 is executing and handles third party inputs received from another user operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual worlds or complex avatars might not be configured to perform well on certain device types, and therefore, while client 104 can operate on many platforms and devices, not all virtual worlds or complex avatars will be available or have full functionality on all client devices 106.

User interface service 108 is one service that is part of client 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client 104 is permitted to enter. Worlds API 128 can retrieve all public worlds from the world assets database 130 and send a list of those to client 104. Additionally, worlds API 128 can request world IDs for any private worlds associated with the user account logged into client 104 and retrieve the private worlds from the world assets database 130 to send to client 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual world from the menu provided by the user interface service 108, client 104 can download an instance of the virtual world by calling the worlds API 128, which can retrieve the virtual world from worlds world assets database 130 and send it to client 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client 104 can also establish a session with networking services 112 for the specific instance of the world. Networking services 112 can provide information about the current state of the instance of the virtual world. For example, networking services 112 can provide a list of remote avatars 126 present in the virtual world instance to client 104. In turn, client 104 can contact the avatars API 136 to download complex avatar assets for the list of remote complex avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics.

The downloaded instance of the virtual world can be executed by client 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client 104, and the user of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The current world 120 also has features that require networking. The current world 120 could have objects, like scissors or a light switch, that a user can pick up, and the object needs to broadcast its state across the network so that other users in the current world 120 can view the current state of the object.

Each of the local player 116, current world 120, and remote player 124 are connected to the runtime networking service 122. The local player 116 primarily transmits updated state information for the local player 116 to remote instances of client 104 that are also executing the same virtual world. The current world 120 can transmit and receive state information about the instance of the virtual world. The current world executing on client 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking plug-in such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered in a world on the virtual world platform 102.

In some embodiments virtual world platform 102 can also include a simplified avatars service 146. As will be described herein, simplified avatars service 146 can create simplified versions of complex avatars and store the avatar assets for the simplified versions of the complex avatars in avatar assets database 138.

While the virtual world platform 102 is suited to carrying out the present technology, persons of ordinary skill in the art will appreciate that the present technology can be used in other environments.

Figure 2:
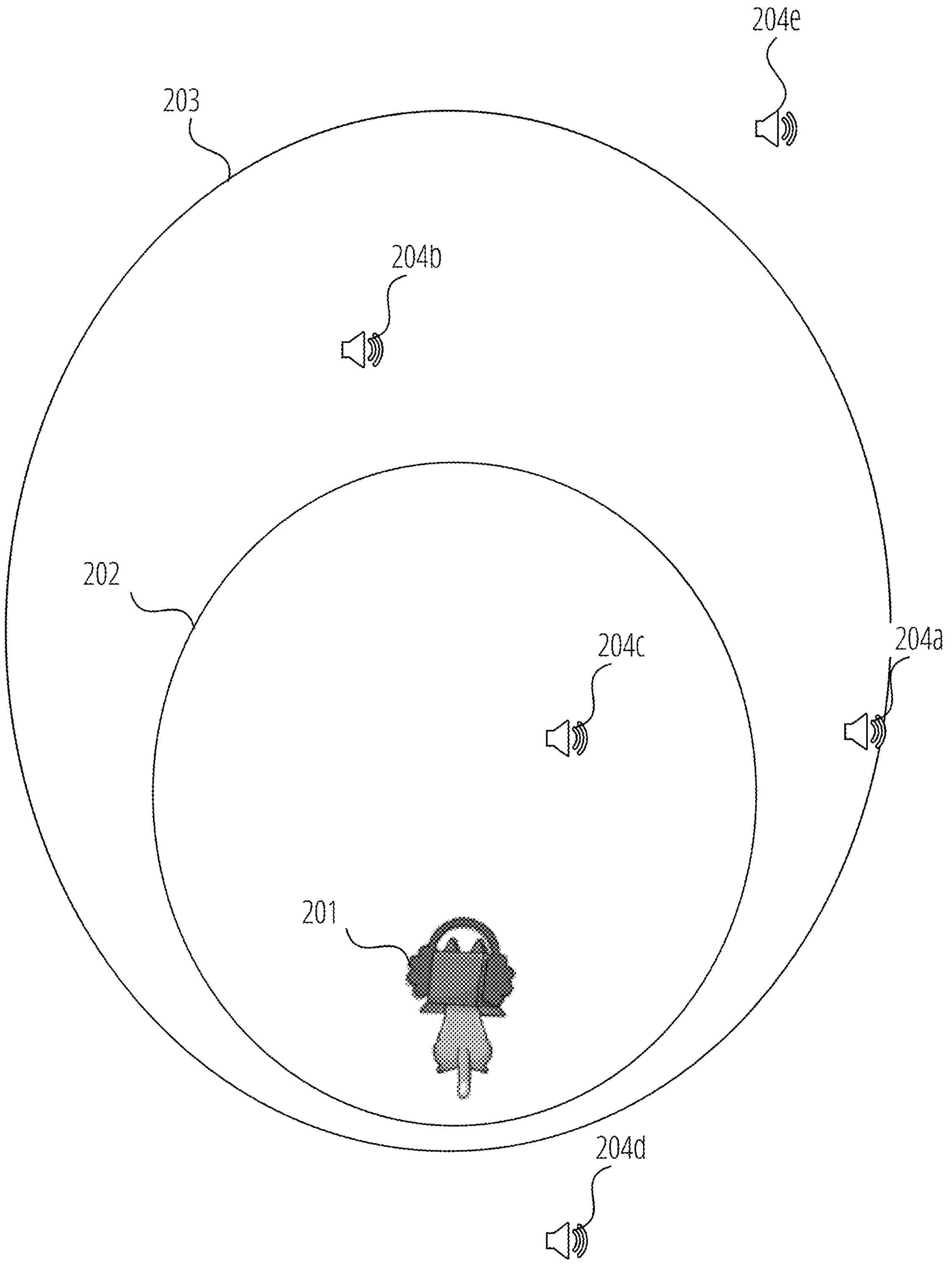
FIG. 2 illustrates an example virtual world showing audio sources and a local player to demonstrate some general principles of the present technology.

FIG. 2 illustrates an example virtual world showing audio sources and a local player to demonstrate some general principles of the present technology.

FIG. 2 illustrates a local player 201 in a virtual world with audio sources 206. The audio sources can be fixed objects of the virtual world, can be objects that can be transported by remote players, or can be the remote players themselves.

The present technology provides a more realistic sound experience for the local player. Since humans hear sound that is in front of them better than sounds from the side or behind them, the present technology attempts to approximate that experience. Accordingly, the present technology scales an audio source's volume as it gets nearer to the local player. Additionally, the direction of approach is also accounted for such that an audio source's volume might increase more slowly or quickly when approaching from different directions. This behavior of the present technology avoids startling a local player when a remote player's voice suddenly becomes audible and can help a local player become aware of when other players that the local player is not directly facing approach and try to engage the local player in conversation.

In total the present technology provides a more natural audio experience. In particular, the present technology provides an inner cone 202 where audio sources within the inner cone 202, such as audio source 204*c*, are presented at full volume and an outer cone 203 where audio sources outside the outer cone 203, such as audio source 204*d* and audio source 204*e*, are presented at a minimum volume, or not at all. Audio sources that originate between the inner cone 202 and outer cone 203, such as audio source 204*a* and audio source 204*b*, are scaled based on their distance between the inner cone 202 and outer cone 203.

More particularly, the inner cone 202 represents an area that is proximate to the local player 201 such that all audio sources within the inner cone 202 can be presented at their normal system volume.

Note that the local player 201 is offset from the center of the inner cone such that more area of the inner cone 202 is in front of the local player 201. An audio source that is close to the local player 201, but that is behind the local player 201, such as audio source 204*d*, will not be heard as loud as an audio source such as audio source 204*c* because audio source 204*d* is behind the local player 201.

The present technology also provides a spatial aspect by shaping the inner cone 202 and outer cone 203 based on the forward vector of the local player 116 so that more sounds are audible that are in front of the local player 116 and less sounds behind the local player 116 are audible. This can be demonstrated with respect to the relative volumes of audio source 204*a* and audio source 204*b*. Both of these audio sources are between the inner cone 202 and the outer cone 203. Audio sources in this area are subject to having a scaled volume that reduces their volume based on a drop-off from their normal system volume at the boundary of the inner cone 202 to a configured minimum volume at the boundary of the outer cone 203. As is illustrated in FIG. 2 the area between the inner cone 202 and the outer cone 203 is at its greatest directly in front of the local player 201, which indicates a more gradual sound drop-off, whereas there is less area between the cones to the sides, which indicates a faster sound drop-off. Accordingly, audio source 204*b* may have a louder volume even though it is a further distance away than audio source 204*a* because audio source 204*a* is closer to the boundary of the outer cone 203.

Figure 3:
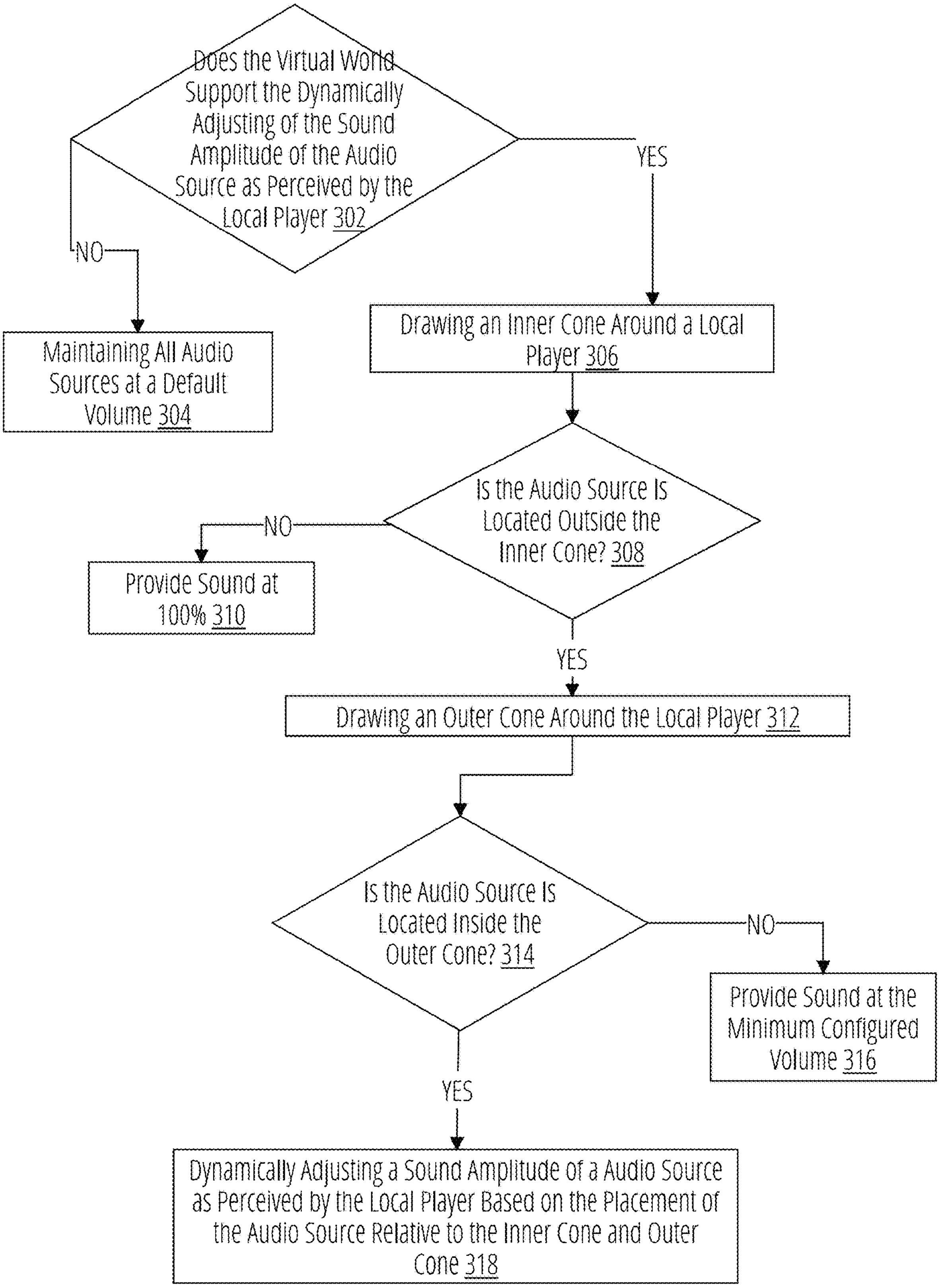
FIG. 3 illustrates an example routine for dynamically adjusting the sound amplitude of an audio source as perceived by a local player based on the direction and distance of the audio source from the local player in accordance with some aspects of the present technology.

FIG. 3 illustrates an example routine for dynamically adjusting the sound amplitude of an audio source as perceived by a local player based on the direction and distance of the audio source from the local player in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes determining whether the virtual world supports the dynamic adjusting of the sound amplitude of the audio source as perceived by the local player at decision block 302. For example, the client 104 illustrated in FIG. 1 may determine whether the virtual world supports the dynamic adjusting of the sound amplitude of the audio source as perceived by the local player. In some embodiments, some virtual worlds can be used for meetings or events where a particular remote player or other audio source should be heard regardless of the location of the audio source. For example, if the virtual world is configured to host a concert, the remote player that is the artist should generally be audible to the local player. Accordingly, when the virtual world does not support the dynamic adjusting of the sound amplitude, the method includes maintaining all audio sources at a default volume at block 304.

However, many virtual worlds are designed as social spaces to allow the players within the world to interact. For these worlds, the present technology can enhance the experience of players by making it easier to hear the audio sources nearest to them. In many instances, the audio source can be remote players in the virtual world, but the present technology can also be applied to other audio sources such as sound effects emanating from features in the virtual world. However, any background music or sound effects are not a type of audio source that should be affected by the present technology.

When it is determined that the virtual world supports (or does not prohibit) the dynamic adjustment of the sound amplitude of audio sources, the method includes drawing an inner cone around a local player at block 306. For example, the client 104 illustrated in FIG. 1 may draw an inner cone around a local player. More detail on the method of drawing the inner cone is addressed with respect to FIG. 9. The inner cone is not visible to the local player or remote players, and the inner cone represents an area in which any audio source within the inner cone should be audible at their current system volume without moderation by the present technology.

The size of the inner cone can be dependent on a cone variable that can be adjustable by the local player. Any audio source that is within the inner cone will have its volume presented at the first sound amplitude associated with the inner cone. The first sound amplitude can be a default system volume for the audio source.

Figure 4:
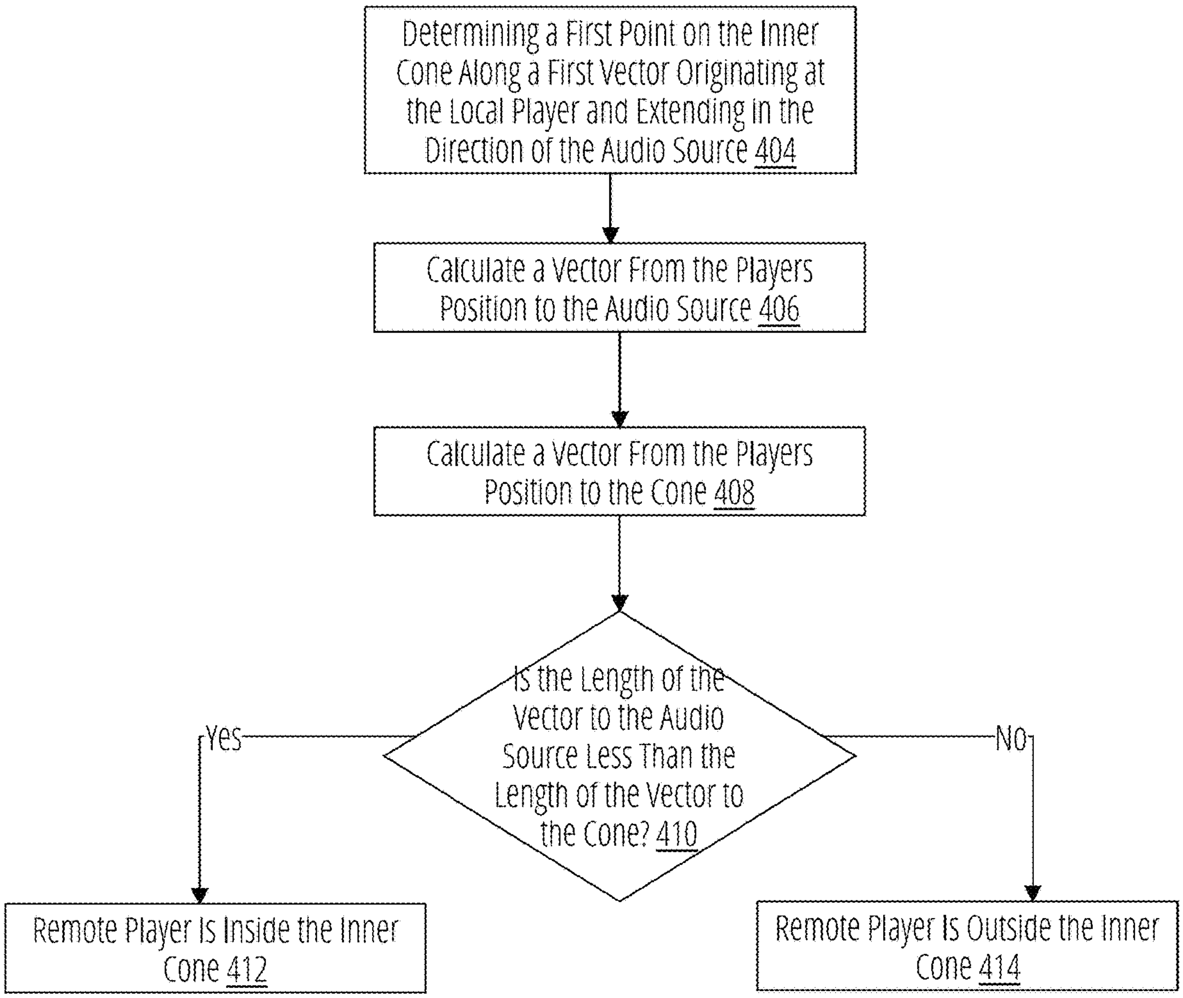
FIG. 4 illustrates an example routine for determining whether an audio source is located within the inner cone in accordance with some aspects of the present technology.
Figure 5:
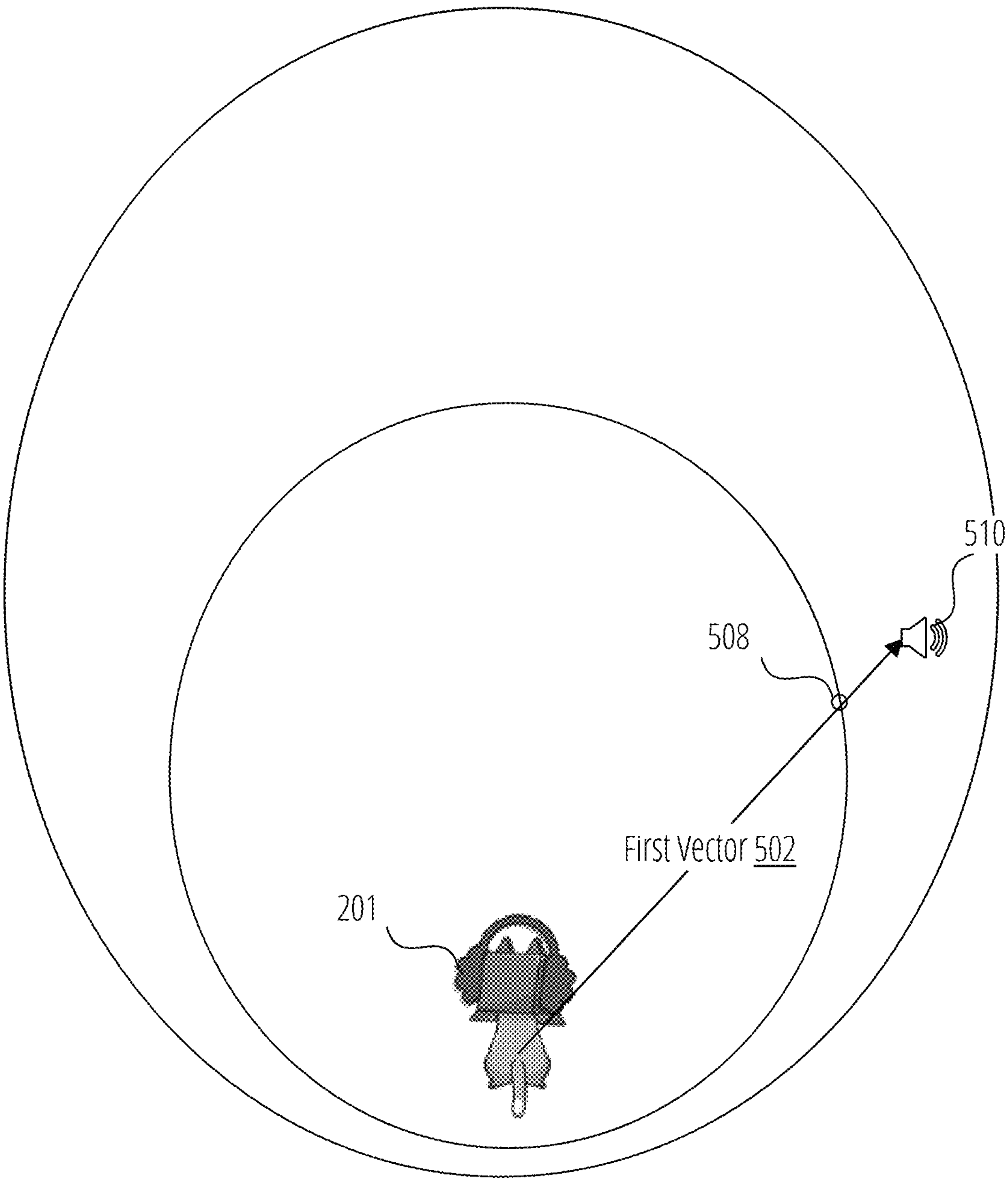
FIG. 5 illustrates an example portion of a virtual world showing an audio source and vectors drawn with respect to the audio source to determine the location of the audio source with respect to the inner cone in accordance with some aspects of the present technology.

According to some examples, the method includes determining whether the audio source is located outside the inner cone at decision block 308. When it is determined that the audio source is within the inner cone, the method includes providing sound at 100% of the default system volume for the audio source at block 310. An example of how the client 104 can determine whether the audio source is located within the inner cone or not is illustrated in FIG. 4 and FIG. 5.

However, when it is determined that the audio source is located outside the inner cone, the method will reduce the volume of the audio source. To determine how much to reduce the volume of the audio source, the client 104 needs to determine where the audio source is located relative to the perimeter of the inner cone and an outer cone.

In some aspects, it can be more efficient to wait to draw an outer cone until it is determined that an outer cone is needed. For example, if the audio source is located within the inner cone, there is no need to draw an outer cone. According to some examples, the method includes drawing the outer cone around the local player at block 312. For example, the client 104 illustrated in FIG. 1 may draw an outer cone around the local player. The outer cone encompasses the inner cone. More detail on the method of drawing the outer cone is addressed with respect to FIG. 9.

According to some examples, the method includes determining whether the audio source is located inside the outer cone at decision block 314. For example, the client 104 illustrated in FIG. 1 may determine whether the audio source is located inside the outer cone. More detail on the method of determining whether the audio source is located inside the outer cone is addressed with respect to FIG. 6 and FIG. 7

According to some examples, the method includes providing sound at a second sound amplitude, which is the minimum configured volume, at block 316 when it is determined that the audio source is located outside the outer cone. For example, the client 104 illustrated in FIG. 1 may provide sound at the minimum configured volume. The second sound amplitude is a configurable minimum volume applied to any audio source located outside the outer cone. For example, a user can configure the minimum volume to be applied to any audio source located outside the outer cone. In some aspects, the minimum volume can be 0% of the system volume, such that any audio source outside of the outer cone is not heard by the local player.

However, when the audio source is determined to be inside the outer cone (and it has already been determined to be outside the inner cone), the method includes dynamically adjusting the sound amplitude of the audio source at block 318. For example, the client 104 illustrated in FIG. 1 may dynamically adjust the sound amplitude of the audio source as perceived by the local player based on the placement of the audio source relative to the inner cone and outer cone.

The sound amplitude of an audio source located outside the inner cone and inside the outer cone is scaled between a first sound amplitude associated with the inner code and a second sound amplitude for audio sources located outside the outer cone. In this way, when an audio source, such as a remote player enters the outer cone it can begin to be perceived by the local player, and as the audio source gets closer to the inner cone its volume can increase until it reaches 100% of the system volume as the audio source crosses the inner cone boundary. This provides an improved user experience to the local player such that audio sources, especially remote players don't appear too suddenly. Imagine a remote player trying to get the attention of a local player. In systems where the remote player is not heard at all until they cross a boundary the remote player might not be aware that they are not being heard by the local player, and the local player might not be aware that the remote player is trying to get their attention. However, the present technology better approximates a real-world environment where a remote player that is farther away can be heard and potentially gain the attention of the local player. In turn, the local player and the remote player can move to make it easier to communicate.

While the method addressed above was described with respect to a single remote player, the method can be used iteratively to determine a volume for multiple remote players respective to each remote player's location relative to the inner cone and outer cone.

In some aspects, when there is a plurality of audio sources within the outer cone or inner cone, the local player might not want to hear all of the remote players, even at a reduced volume. In such aspects, the present technology can allow the local player to make a selection of a first audio source, such as a remote player to be given a volume preference. The method can reduce the volume of the audio sources within the outer cone or inner cone other than the selected first audio source, whereby sound from the first audio source is given preference over the rest of the audio sources within the outer cone or inner cone. In some aspects, the non-selected audio source can be muted. In some aspects, the local player can select multiple audio sources.

FIG. 4 illustrates an example routine for determining whether an audio source is located within the inner cone in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The example routine illustrated in FIG. 4 will be described with reference to FIG. 5. FIG. 5 illustrates an example portion of a virtual world showing an audio source and vectors drawn with respect to the audio source to determine the location of the audio source with respect to the inner cone in accordance with some aspects of the present technology.

According to some examples, the method includes determining a first point on the inner cone along a first vector originating at the local player and extending in the direction of the audio source at block 404. For example, the client 104 illustrated in FIG. 1 may determine a first point on the inner cone along a first vector originating at the local player and extending in the direction of the audio source. FIG. 5 illustrates the first vector 502 originating at the local player 201 and extending toward the audio source 510. The first vector 502 crosses the inner cone at the first point 508.

According to some examples, the method includes calculating a vector from the local player's position to the audio source at block 406. For example, the client 104 illustrated in FIG. 1 may calculate a vector from the local player's position to the audio source.

According to some examples, the method includes calculating a vector from the local player's position to the cone at block 408. For example, the client 104 illustrated in FIG. 1 may calculate a vector from the local player's position to the first point on the inner cone.

According to some examples, the method includes determining whether the length of the vector to the audio source is less than the length of the vector to the first point on the inner cone at decision block 410. For example, the client 104 illustrated in FIG. 1 may determine whether the length of the vector to the audio source is less than the length of the vector to the cone by comparing a distance to the first point on the inner cone with a distance from the local player to the audio source.

When the distance to the first point is greater than the distance to the audio source, the client 104 can conclude, at block 412, that the audio source is within the inner cone, and can proceed to block 310 as described with respect to FIG. 3.

When the distance to the first point on the inner cone is less than the distance to the audio source, the client 104 can conclude, at block 414, that the audio source is located outside the inner cone, and can proceed to block 312 as described with respect to FIG. 3.

Figure 6:
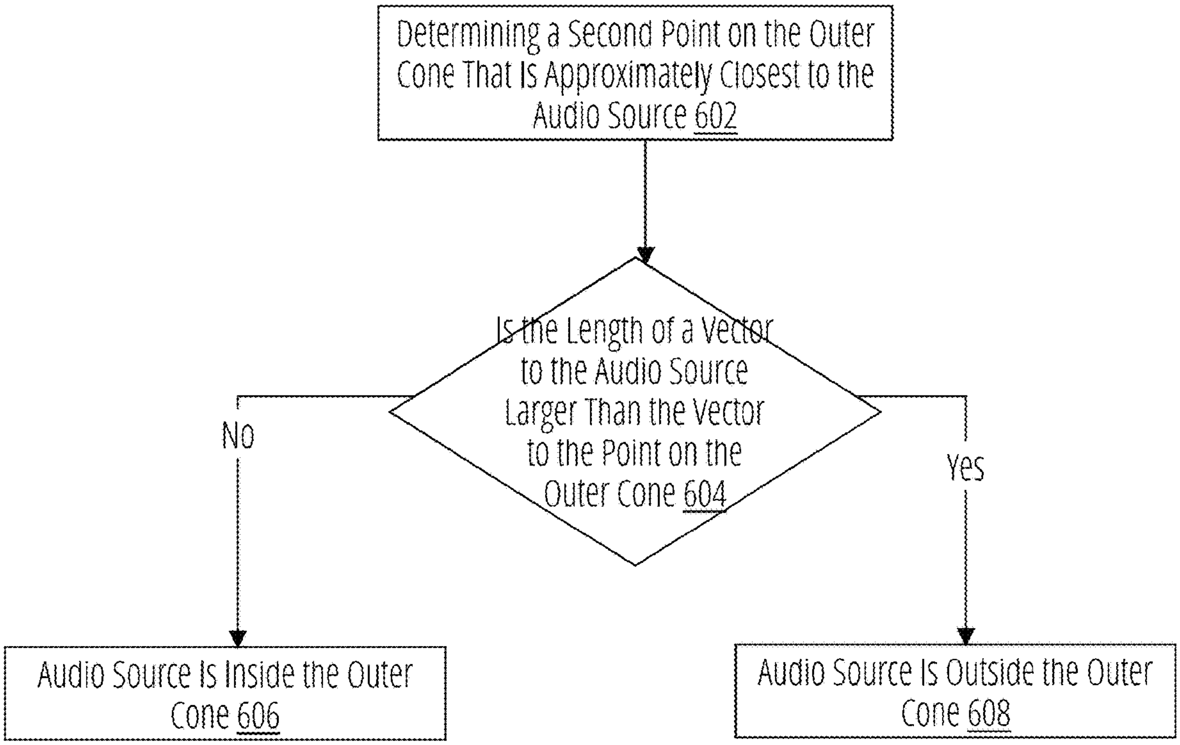
FIG. 6 illustrates an example routine for determining whether an audio source is located within the outer cone in accordance with some aspects of the present technology.

FIG. 6 illustrates an example routine for determining whether an audio source is located within the outer cone in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Figure 7:
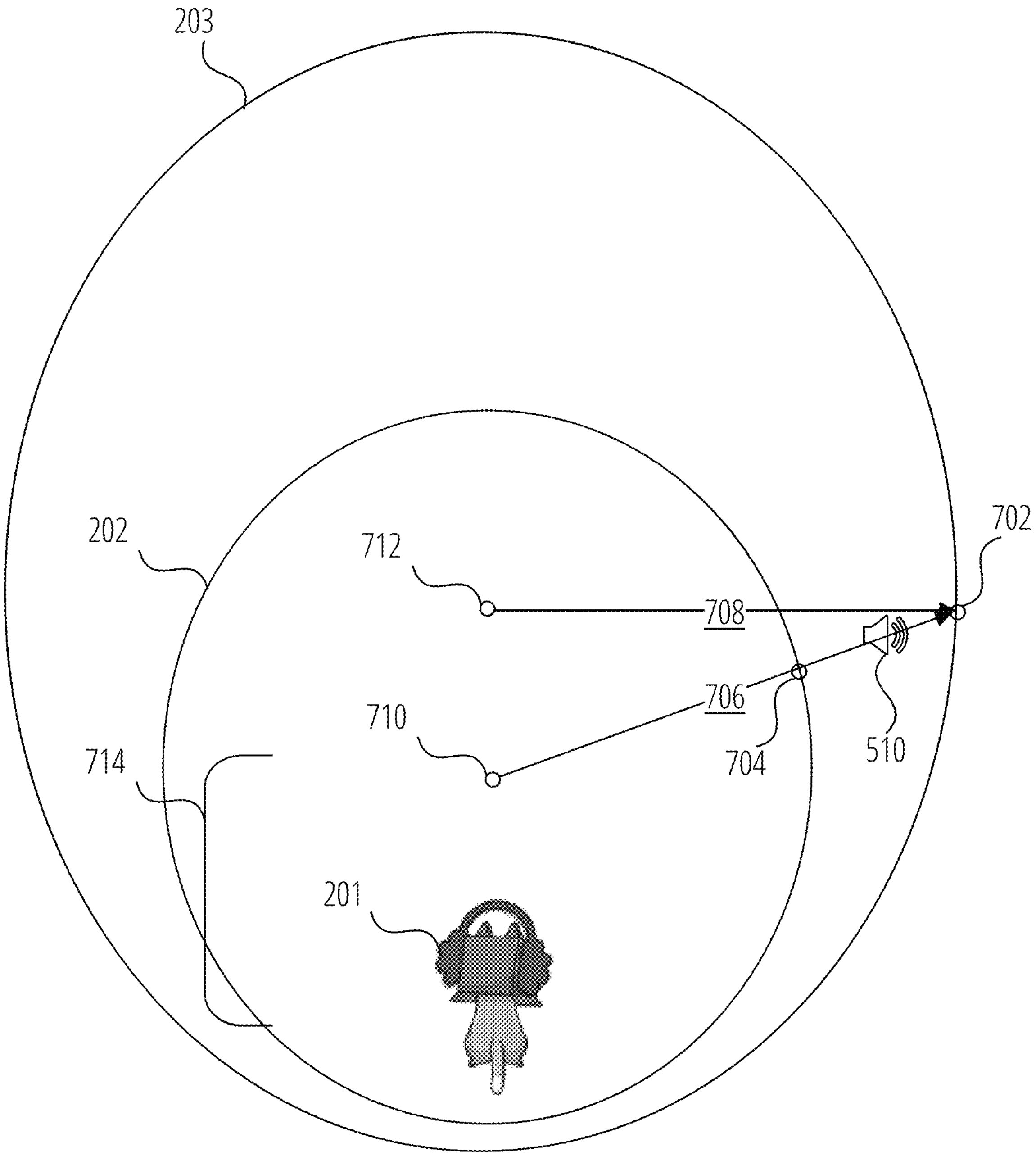
FIG. 7 illustrates an example portion of a virtual world showing an audio source and vectors drawn with respect to the audio source to determine the location of the audio source with respect to the inner cone and outer cone in accordance with some aspects of the present technology.

The example routine illustrated in FIG. 6 will be described with reference to FIG. 7. FIG. 7 illustrates an example portion of a virtual world showing an audio source and vectors drawn with respect to the audio source to determine the location of the audio source with respect to the inner cone and outer cone in accordance with some aspects of the present technology.

According to some examples, the method includes determining a second point on the outer cone that is approximately closest to the audio source at block 602. For example, the client 104 illustrated in FIG. 1 may determine a second point on the outer cone that is approximately closest to the audio source. As illustrated in FIG. 7, the location of the second point can be determined by the client 104 drawing a second vector 706 from the center of inner cone 710 extending in the approximate direction of the audio source 510 and intersecting the outer cone 203. Additionally, the client 104 can draw a third vector 708 from a center of the center of outer cone 712 to intersect with the second vector 706 on, or approximately on, the outer cone 203. The intersection of the second vector 706 and the third vector 708 is the second point 702.

While other methods can be used to determine a point on the outer cone that is proximate to the audio source 510, such as drawing a vector from the local player 201 through the audio source 510 and intersecting the outer cone, the present technology utilizes the procedure addressed above with respect to block 602 to simplify some calculations that will be needed later to determine a scaling factor to scale the volume for an audio source located outside the inner cone and inside the outer cone, as addressed in greater detail with respect to FIG. 8.

According to some examples, the method includes determining whether the length of a vector to the audio source is larger than the vector to the point on the outer cone. For example, the method includes determining whether the length along the second vector 706 to the audio source 510 is larger than the length along the second vector 706 to the second point 702 on the outer cone 203 at decision block 604. Again, other methods than using the second vector can be used to determine whether the length of a vector to the audio source is larger than the vector to the point on the outer cone. For example, a vector can be drawn from the local player. However, the second vector 706 can be used to simplify some calculations that will be needed later to determine a scaling factor to scale the volume for an audio source located outside the inner cone and inside the outer cone, as addressed in greater detail with respect to FIG. 8.

For example, the client 104 illustrated in FIG. 1 may determine that the length from the center of inner cone 710 to the audio source 510 is less than the length from center of inner cone 710 to the second point 702 on the outer cone at block 606, whereby the audio source is inside the outer cone, as is illustrated in FIG. 7. As is illustrated at block 318 in FIG. 3, when the audio source 510 is located inside the outer cone and outside the inner cone, the volume of the audio source 510 is scaled to a volume between the current system volume and the minimum configured volume. FIG. 8 addresses the scaling of the volume between the current system volume and the minimum configured volume.

Alternatively, the client 104 illustrated in FIG. 1 may determine that the length from the center of inner cone 710 to the audio source 510 is larger than the length from the center of inner cone 710 to the second point 702 on the outer cone at block 608, whereby the audio source is outside the outer cone. As is illustrated at block 316 in FIG. 3, when the audio source 510 is located outside the outer cone, the volume of the audio source 510 is adjusted to the minimum configured volume.

Figure 8:
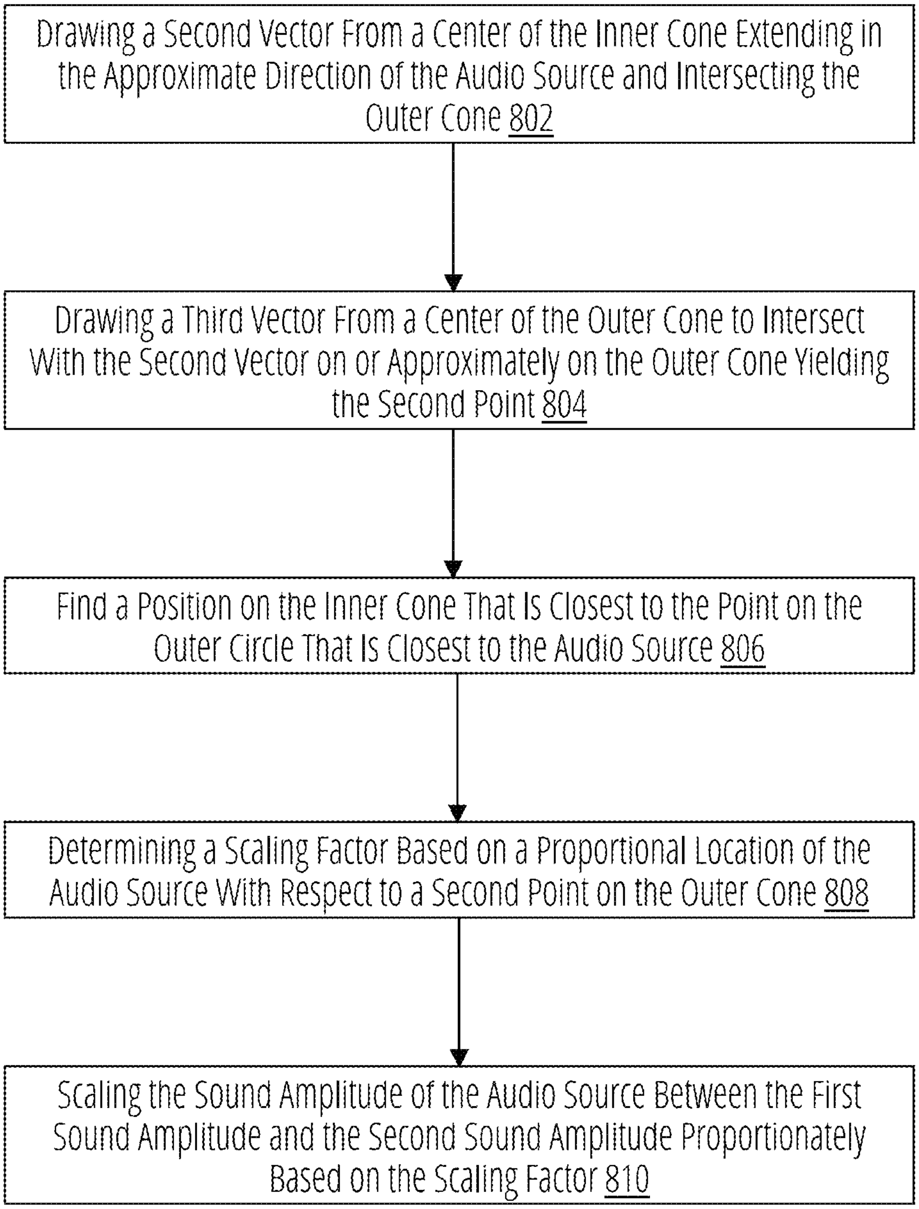
FIG. 8 illustrates an example routine for scaling the sound amplitude of the audio source between the first sound amplitude and the second sound amplitude proportionately based on the scaling factor in accordance with some aspects of the present technology.

FIG. 8 illustrates an example routine for scaling the sound amplitude of the audio source between the first sound amplitude and the second sound amplitude proportionately based on the scaling factor in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As introduced above, audio sources within the inner cone are presented at their current system volume (first sound amplitude), and audio sources outside the outer cone are presented at their minimum configured volume (second sound amplitude), but audio sources that are between the inner cone and outer cone are presented at a scaled volume that is an amplitude between the first sound amplitude and the second sound amplitude. FIG. 8 presents an example routine to determine how much to scale the volume of the audio source.

In some aspects, the volume of the audio source can be linearly scaled based on the relative distance of the audio source from the inner cone and outer cone. However, to perform this linear scaling, the routine needs to learn the distance between the inner cone and outer cone and the relative location of the audio source.

According to some examples, the method includes drawing a second vector from the center of the inner cone extending in the approximate direction of the audio source and intersecting the outer cone at block 802. For example, the client 104 illustrated in FIG. 1 may draw a second vector 706 from the center of the inner cone 202 extending in the approximate direction of the audio source 510 and intersecting the outer cone 203 at approximately the second point 702.

According to some examples, the method includes drawing a third vector from the center of the outer cone to intersect with the second vector on or approximately on the outer cone yielding the second point at block 804. For example, the client 104 illustrated in FIG. 1 may draw a third vector from the center of the outer cone to intersect with the second vector on or approximately on the outer cone yielding the second point. The second point is at an intersection of the third vector 708 and the second vector 706.

According to some examples, the method includes finding a position on the inner cone 202 that is closest to the point on the outer cone 203 that is closest to the audio source 510 at block 806. For example, the client 104 illustrated in FIG. 1 may find a position on the inner cone 202 that is closest to the point on the outer cone 203 that is closest to the audio source. The position on the inner cone 202 that is closest to the point on the outer cone 203 can be a third point 704 located at an intersection of the second vector 706 with the inner cone 202.

While other methods can be used to determine a point on the outer cone that is proximate to the audio source 510, such as drawing a vector from the local player 201 through the audio source 510 and intersecting the outer cone, the present technology utilizes the procedure addressed above with respect to block 602 to simplify some calculations that will be needed later to determine a scaling factor to scale the volume for an audio source located outside the inner cone and inside the outer cone. Specifically, it is a bit easier to determine distances to the boundary of the inner cone (third point 704) along the second vector from the center of the inner cone since we created the shape of the inner cone using a known radius and transforming the shape of the inner cone. Likewise, the length to the outer cone (second point 702) along the third vector 708 can be determined using the known radius of the outer cone and the transformation to create the outer cone. Even the length of the second vector to the outer cone can be determined easily by using geometry since the offset of the center of the outer cone to the center of the inner cone is known and the length along the third vector 708 to the second point 702 is known. And as will be addressed below, the distance between the third point 704 and the second point 702 is used to determine the scaling factor.

According to some examples, the method includes determining a scaling factor based on a proportional location of the audio source with respect to a second point on the outer cone at block 808. For example, the client 104 illustrated in FIG. 1 may determine a scaling factor based on a proportional location of the audio source with respect to a second point on the outer cone.

In order to determine the proportional location of the audio source with respect to a second point on the outer cone, the client 104 first determines the length of the distance between the second point 702 and the third point 704. This can be accomplished by using the geometry of a triangle since the client 104 can determine the length of the third vector 708 between the center of outer cone 712 and the second point 702 based on the radius of the outer cone 203. The client can also determine the offset between the center of outer cone 712 and the center of inner cone 710 based on the offset variable. This offset between the center of outer cone 712 and the center of inner cone 710 is effectively another known length of a side of a triangle (with second vector 706 and third vector 708 being the other two sides). The side of the triangle made up of the second vector 706 extending to second point 702 needs to be determined using triangle geometry because the second vector 706 does not originate from the center of outer cone 712 and thus the radius of the outer cone is not helpful.

The offset between the center of outer cone 712 and the center of inner cone 710 is known or can be determined based on the offset variable. If not for the offset variable the local player 201, the center of inner cone 710, and the center of outer cone 712 would be co-located at the center of the inner cone and outer cone. However, the offset variable adjusts the location of the local player 201 with respect to the center of inner cone 710 and the center of outer cone 712, such that a larger value offsets the local player 116 towards the rear of the inner cone and outer cone. Since the outer cone 203 is larger than the inner cone, the center of outer cone 712 ends up located further away from the local player 201 than the center of inner cone 710. More specifically, the offset variable moves the center of inner cone 710 and the center of outer cone 712 forward until the local player 201 is located toward the rear of the inner cone and outer cone. In FIG. 7, the offset variable 714 demonstrates a distance in which local player 201 has been offset from the center of inner cone 710.

Using the known values of the offset between the center of inner cone 710 and the center of outer cone 712, and a length of the third vector 708 between the center of outer cone 712 and the second point 702, the solved for length of the second vector between the center of inner cone 506 and the second point 702, and the known distance between the center of inner cone 506 and the third point 704, the client 104 can calculate a length of a second segment of the second vector 706 defined between the third point and the second point by subtracting the distance from the center of the inner cone to the third point from the distance from the center of the inner cone to the second point.

Now that the length of the second segment of the second vector 706 defined between the third point 704 and the second point 702 has been determined, the scaling factor can be determined by performing a linear interpolation to generate the scaling factor based on the distance of the audio source between the second point and the third point to yield a result of the linear interpolation. The result of the linear interpolation is a factor making up the scaling factor. The scaling factor is a number between 0-1 that is used to reduce the first sound amplitude proportionally until the second sound amplitude is reached.

According to some examples, the method includes scaling the sound amplitude of the audio source between the first sound amplitude and the second sound amplitude proportionately based on the scaling factor at block 810. For example, the client 104 illustrated in FIG. 1 may scale the sound amplitude of the audio source between the first sound amplitude and the second sound amplitude proportionately based on the scaling factor.

In sound aspects, another factor making up the scaling factor can include a dot product of a forward vector of the local player and the first vector. This technique yields a higher value when the forward vector and the first vector are similar. The more similar the forward vector and the first vector, the audio source is located more in front of the local player. Therefore, the use of the dot product of a forward vector of the local player and the first vector approximates the directional quality of sound perception by human ears in the real world wherein sounds that are in front of a human are easier to hear than sounds from the side or behind the human. Thus, the scaling factor is further reduced for sounds that are further away from the forward vector of the local player 201. The effect of the reduced scaling factor is an increased reduction in the first sound amplitude towards the lower second sound amplitude.

Figure 9:
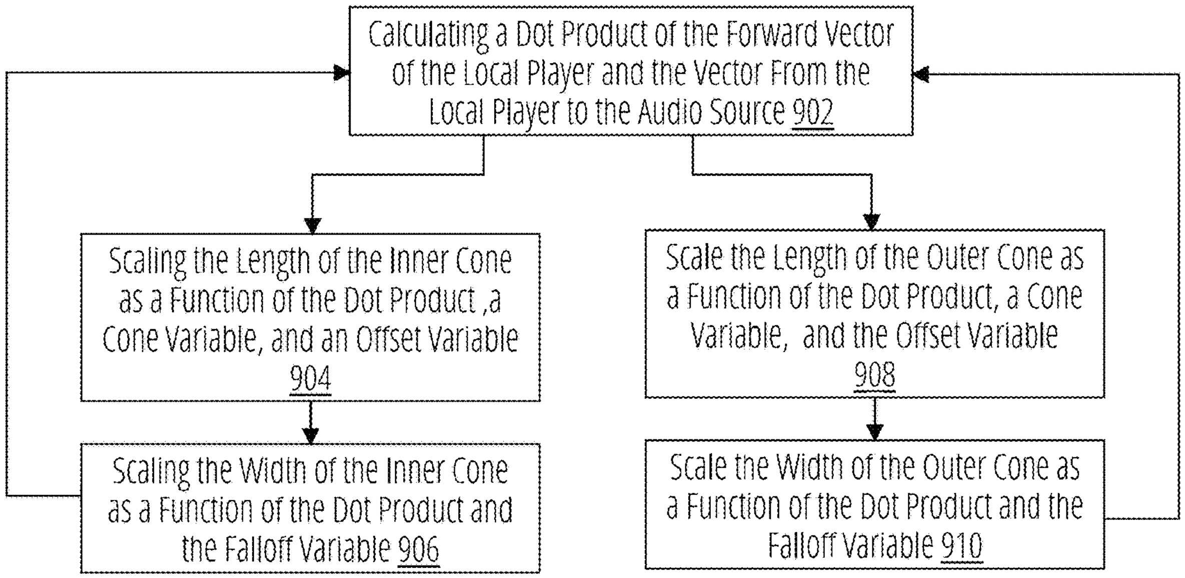
FIG. 9 illustrates an example routine for determining the size and shape of the inner cone and outer cone in accordance with some aspects of the present technology.

FIG. 9 illustrates an example routine for determining the size and shape of the inner cone and outer cone in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Figure 10:
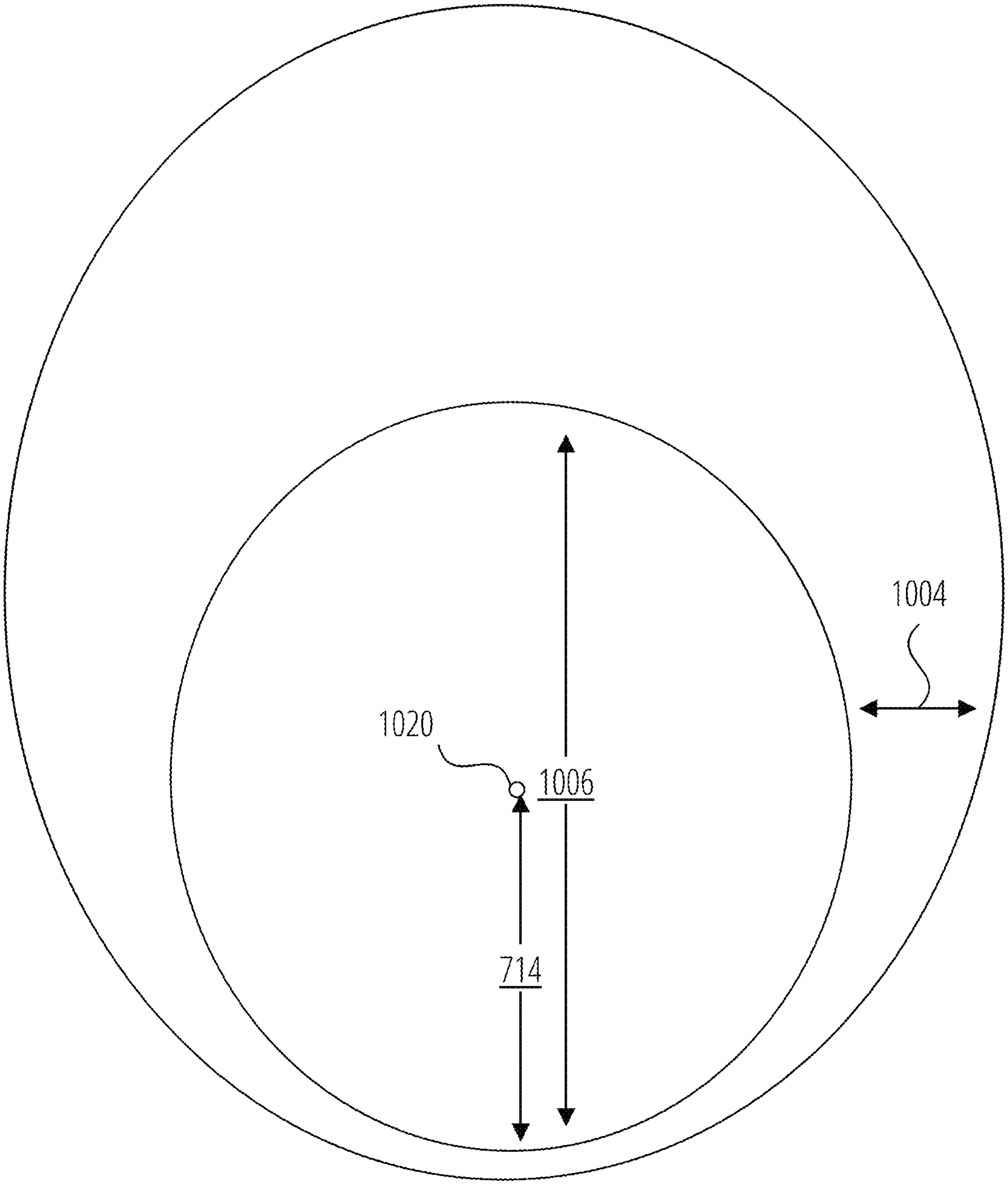
FIG. 10 illustrates an examples off an offset variable, a cone variable, and a falloff variable in accordance with some aspects of the present technology.

The example routine illustrated in FIG. 9 will be described with reference to FIG. 10. FIG. 10 illustrates an examples off an offset variable, a cone variable, and a falloff variable in accordance with some aspects of the present technology.

In some aspects of the present technology, the inner cone 202 and outer cone 203 can be drawn with respect to the local player's forward vector. In this way, the inner cone 202 and outer cone 203 maintain a relationship with the forward vector of the local player and as such audio sources that are closer to the forward vector are more likely to be heard because the shape of the inner cone 202 and outer cone 203 is oblong to give the cones the most amount of area in a forward direction from the local player.

As addressed herein, the forward vector of the local player is important in providing a more realistic sound experience for the local player. Since humans hear sound that is in front of them better than sounds from the side or behind them, the present technology attempts to approximate that experience. However, there can be a question about what direction should be used as a forward vector for a local player. Should the forward vector be associated with the local player's hips, or the player's head? A more realistic sound experience might be provided by determining the local player's forward vector with their head since it is the shape of a human's head and ears that affects the directionality of human sound perception, but users controlling the local player, especially when using sensors on the hips, might find the experience disorienting as they might expect their forward vector to be associated with their hips. The association of the forward vector with the hips or head can be configurable by the user.

Accordingly, an aspect of determining the forward vector of the local player can include determining whether the avatar is configured with the forward vector attached to the hips of the avatar or the camera direction (head direction) of the avatar. When the forward vector is attached to the hips of the avatar, the avatar can look from side to side, but the forward vector will remain oriented with the hips of the avatar. When the forward vector is attached to the camera direction, the forward vector will move as the avatar looks from side to side.

Although the association of the forward vector with the hips or head can be configurable by the user, there are events wherein the forward vector might automatically be associated with the local player's hips or head, irrespective of configuration. For example, when a local player lays down, their hips and head are pointing at the ceiling. Accordingly, the present technology can associate the forward vector with the local player's hips and rotate the plain of the forward vector from a vertical plain to a horizontal plain since less audio sources are on a ceiling or sky. In another example, if the local player is sitting, the forward vector can be associated with the local player's camera direction (head). This makes particular sense if the local player is seated at a conference table and they are generally looking in the direction of the remote player they are listening to. (However, in some conference environments, the dynamic sound scaling of the present technology might be turned off making the forward vector irrelevant).

A shape of the inner cone and the outer cone are also transformed by a factor of a 1006. A larger 1006 causes the inner cone and outer cone to become more oblong in a forward vector of the local player.

A position of the local player within the inner cone and the outer cone is shifted inversely to the forward vector of the local player based on the offset variable 714. When the offset variable 714 is at its largest the back side of the local player is most proximate to the rear portion of the first boundary created by the inner cone and the second boundary created by the outer cone.

It can also be beneficial to adjust the shape of the cones based on the relationship of the local player and the audio source as determined by the dot product of the forward vector of the local player and the vector from the local player to the audio source. Such a relationship can give the inner cone 202 and outer cone 203 a more oblong shape when an audio source is in front of the local player and a slightly wider shape, and greater differentiation between the boundaries of the inner cone 202 and outer cone 203 when the audio source is somewhat off to the side of the local player. The use of the dot product in this way can also help to approximate sound perception by human ears in the real world.

According to some examples, the method includes calculating a dot product of the forward vector of the local player and the vector from the local player to the audio source at block 902. For example, the client 104 illustrated in FIG. 1 may calculate a dot product of the forward vector of the local player and the vector from the local player to the audio source.

According to some examples, the method includes scaling the length of the inner cone as a function of the dot product, the 1006, and an offset variable 714 at block 904 and scaling the length of the outer cone as a function of the dot product, 1006, and the offset variable 714 at block 908. For example, the client 104 illustrated in FIG. 1 may scale the length of the inner cone and the outer cone as a function of the dot product, cone variable, and offset variable.

According to some examples, the method includes scaling the width of the inner cone as a function of the dot product and the falloff variable 1004 at block 906 and scaling the width of the outer cone as a function of the dot product and the falloff variable 1004 at block 910. For example, the client 104 illustrated in FIG. 1 may scale the width of the inner cone as a function of the dot product and the falloff variable. The falloff variable can give greater separation between the inner cone and the outer cone.

Since, in some aspects, the dot product of the forward vector of the local player and the vector from the local player to the audio source is used in drawing the inner cone and outer cone, this means that the inner cone and outer cone are recalculated with respect to individual audio sources. And, since the local player is mobile, and some audio sources are mobile, such as local players, the inner cone and outer cone need to be repeatedly calculated—as does the scaling for the volume of an audio source.

Figure 11:
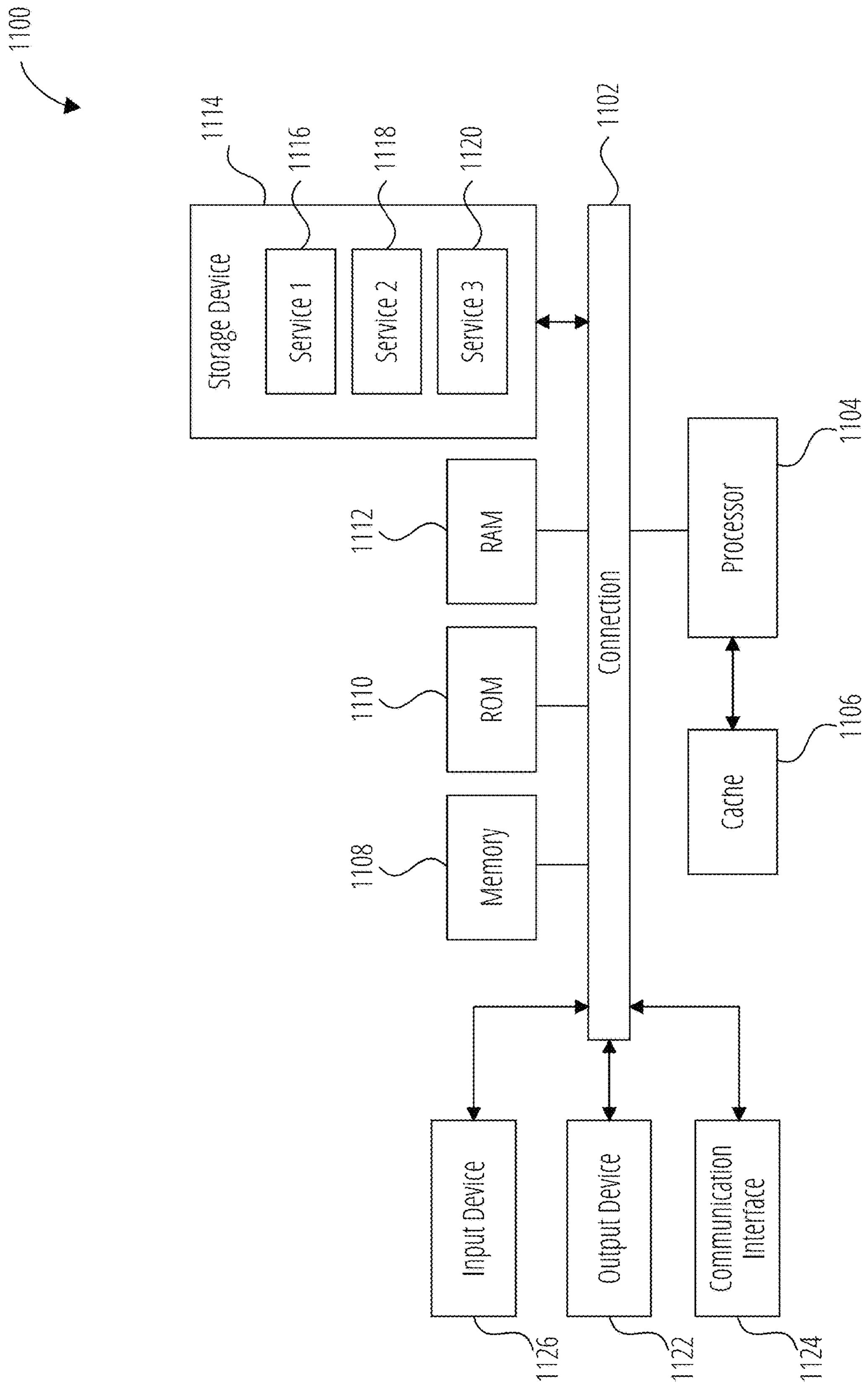
FIG. 11 shows an example of a system for implementing some aspects of the present technology.

FIG. 11 shows an example of computing system 1100, which can be for example any computing device making up client device 106 or any component thereof in which the components of the system are in communication with each other using connection 1102. Connection 1102 can be a physical connection via a bus, or a direct connection into processor 1104, such as in a chipset architecture. Connection 1102 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) 1104 and connection 1102 that couples various system components including system memory 1108, such as read-only memory (ROM) 1110 and random access memory (RAM) 1112 to processor 1104. Computing system 1100 can include a cache of high-speed memory 1106 connected directly with, in close proximity to, or integrated as part of processor 1104.

Processor 1104 can include any general purpose processor and a hardware service or software service, such as services 1116, 1118, and 1120 stored in storage device 1114, configured to control processor 1104 as well as a special-purpose processor where software instructions are incorporated into the actual processor design. Processor 1104 may essentially be a completely self-contained computing system, containing multiple cores or processors, a bus, memory controller, cache, etc. A multi-core processor may be symmetric or asymmetric.

To enable user interaction, computing system 1100 includes an input device 1126, which can represent any number of input mechanisms, such as a microphone for speech, a touch-sensitive screen for gesture or graphical input, keyboard, mouse, motion input, speech, etc. Computing system 1100 can also include output device 1122, which can be one or more of a number of output mechanisms known to those of skill in the art. In some instances, multimodal systems can enable a user to provide multiple types of input/output to communicate with computing system 1100. Computing system 1100 can include communication interface 1124, which can generally govern and manage the user input and system output. There is no restriction on operating on any particular hardware arrangement, and therefore the basic features here may easily be substituted for improved hardware or firmware arrangements as they are developed.

Storage device 1114 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1114 can include software services, servers, services, etc., that when the code that defines such software is executed by the processor 1104, it causes the system to perform a function. In some embodiments, a hardware service that performs a particular function can include the software component stored in a computer-readable medium in connection with the necessary hardware components, such as processor 1104, connection 1102, output device 1122, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The present technology includes computer-readable storage mediums for storing instructions, and systems for executing any one of the methods embodied in the instructions addressed in the aspects of the present technology presented below:

Aspect 1. A method comprising: drawing an inner cone around a local player; drawing an outer cone around the local player, the outer cone encompassing the inner cone; dynamically adjusting a sound amplitude of an audio source as perceived by the local player based on a placement of the audio source relative to the inner cone and the outer cone, wherein the sound amplitude of the audio source located outside the inner cone and inside the outer cone is a scaled sound amplitude between a first sound amplitude associated with the inner cone and a second sound amplitude for audio sources located outside the outer cone.

Aspect 2. The method of Aspect 1, wherein a location of the local player is translated by a factor of an offset variable, wherein a larger offset variable locates the local player offset from a center of the inner cone and the outer cone in a direction inverse to a forward vector of the local player.

Aspect 3. The method of any of Aspects 1 to 2 wherein when the offset variable is at its largest a backside of the local player is most proximate to a rear portion of a first boundary created by the inner cone and a second boundary created by the outer cone.

Aspect 4. The method of any of Aspects 1 to 3, wherein the forward vector of the local player is determined by the method further comprising: determining if the avatar is configured with the forward vector attached to the hips of the avatar or the camera direction (head direction) of the avatar, wherein when the forward vector is attached to the hips of the avatar, the avatar can look from side to side, but the forward vector will remain oriented with the hips of the avatar, wherein when the forward vector is attached to the camera direction, the forward vector will move as the avatar looks from side to side; wherein when an avatar is lying down, translating the forward vector from a vertical axis to a horizontal axis.

Aspect 5. The method of any of Aspects 1 to 4, further comprising: determining that the audio source is located outside the inner cone.

Aspect 6. The method of any of Aspects 1 to 5, wherein the it is determined that the audio source is located outside the inner cone by the method further comprising: determining a first point on the inner cone along a first vector originating at the local player and extending in a direction of the audio source; comparing a distance to the first point on the inner cone with a distance from the local player to the audio source; when the distance to the first point on the inner cone is less than the distance to the audio source, concluding that the audio source is located outside the inner cone.

Aspect 7. The method of any of Aspects 1 to 6, dynamically adjusting the sound amplitude, further comprising: determining a second point on the outer cone that is approximately closest to the audio source; determining a scaling factor based on a proportion al location of the audio source with respect to the second point on the outer cone; and scaling the sound amplitude of the audio source between the first sound amplitude and the second sound amplitude proportionately based on the scaling factor.

Aspect 8. The method of any of Aspects 1 to 7, wherein the determining the second point on the outer cone that is approximately closest to the audio source, further comprises: drawing a second vector from a center of the inner cone extending in an approximate direction of the audio source and intersecting the outer cone; drawing a third vector from a center of the outer cone to intersect with the second vector on or approximately on the outer cone yielding the second point, wherein the second point is at an intersection of the first vector and the second vector.

Aspect 9. The method of any of Aspects 1 to 8, further comprising: determining that the audio source is located inside the outer cone when a distance along the second vector from the center of the inner cone to the audio source is shorter than a distance from the center of the inner cone to the second point.

Aspect 10. The method of any of Aspects 1 to 9, wherein the determining the scaling factor based on the proportional location of the audio source with respect to the second point on the outer cone further comprises: determining a third point from an intersection of a second vector with the inner cone; performing a linear interpolation to generate the scaling factor based on the distance of the audio source between the second point and the third point to yield a result of the linear interpolation, wherein the result of the linear interpolation is a factor making up the scaling factor.

Aspect 11. The method of any of Aspects 1 to 10, wherein the distance to the second point is determined by the method comprising: determining an offset between a center of the inner cone and the center of the outer cone; calculating a distance from the center of the inner cone to the second point using known values of the offset between the center of the inner cone and the center of the outer cone, and a length of a first segment of the third vector defined between the center of the outer cone and the second point.

Aspect 12. The method of any of Aspects 1 to 11, wherein the distance between the second point and the third point is determined by the method comprising: calculating a length of a second segment of the second vector defined between the third point and the second point by subtracting the distance from the center of the inner cone to the third point from the distance from the center of the inner cone to the second point.

Aspect 13. The method of any of Aspects 1 to 12, wherein the determining the scaling factor further comprises: calculating a dot product of a forward vector of the local player and the first vector, wherein the dot product is a factor making up the scaling factor.

Aspect 14. The method of any of Aspects 1 to 13, wherein a size of the inner cone is dependent on a cone variable, wherein the cone variable is adjustable by the local player, wherein any audio source that is within the inner cone will have their volume presented at the first sound amplitude associated with the inner cone.

Aspect 15. The method of any of Aspects 1 to 14, wherein the second sound amplitude is a configurable minimum volume applied to any audio source located outside the outer cone.

Aspect 16. The method of any of Aspects 1 to 15, wherein the drawing the inner cone around the local player further comprises: calculating a dot product of the forward vector of the local player and the vector from the local player to the audio source; scaling the length of the inner cone as a function of the dot product and a cone variable; and scaling the width of the inner cone as a function of the dot product and a falloff variable.

Aspect 17. The method of any of Aspects 1 to 16, further comprising: determining if a virtual world supports the dynamically adjusting of the sound amplitude of the audio source as perceived by the local player; wherein the virtual world does not support the dynamically adjusting of the sound amplitude, maintaining all audio sources at a default volume.

Aspect 18. The method of any of Aspects 1 to 17, further comprising: when a plurality of audio sources are within the outer cone or inner cone, receiving a selection of a first audio source; whereby sound from the first audio source is given preference over the rest of the audio sources within the outer cone or inner cone.

What is claimed is:

1. A method comprising:

drawing an inner cone around a local player;

drawing an outer cone around the local player, the outer cone encompassing the inner cone;

dynamically adjusting a sound amplitude of an audio source as perceived by the local player based on a placement of the audio source relative to the inner cone and the outer cone, wherein the sound amplitude of the audio source located outside the inner cone and inside the outer cone is a scaled sound amplitude between a first sound amplitude associated with the inner cone and a second sound amplitude for audio sources located outside the outer cone.

2. The method of claim 1, wherein a location of the local player is translated by a factor of an offset variable, wherein a larger offset variable locates the local player offset from a center of the inner cone and the outer cone in a direction inverse to a forward vector of the local player.

3. The method of claim 1, wherein the it is determined that the audio source is located outside the inner cone by the method further comprising:

determining a first point on the inner cone along a first vector originating at the local player and extending in a direction of the audio source;

comparing a distance to the first point on the inner cone with a distance from the local player to the audio source;

when the distance to the first point on the inner cone is less than the distance to the audio source, concluding that the audio source is located outside the inner cone.

4. The method of claim 3, dynamically adjusting the sound amplitude, further comprising:

determining a second point on the outer cone that is approximately closest to the audio source;

determining a scaling factor based on a proportional location of the audio source with respect to the second point on the outer cone; and scaling the sound amplitude of the audio source between the first sound amplitude and the second sound amplitude proportionately based on the scaling factor.

5. The method of claim 4, wherein the determining the second point on the outer cone that is approximately closest to the audio source, further comprises:

drawing a second vector from a center of the inner cone extending in an approximate direction of the audio source and intersecting the outer cone;

drawing a third vector from a center of the outer cone to intersect with the second vector on or approximately on the outer cone yielding the second point, wherein the second point is at an intersection of the first vector and the second vector.

6. The method of claim 5, further comprising:

determining that the audio source is located inside the outer cone when a distance along the second vector from the center of the inner cone to the audio source is shorter than a distance from the center of the inner cone to the second point.

7. The method of claim 4, wherein the determining the scaling factor based on the proportional location of the audio source with respect to the second point on the outer cone further comprises:

determining a third point from an intersection of a second vector with the inner cone;

performing a linear interpolation to generate the scaling factor based on the distance of the audio source between the second point and the third point to yield a result of the linear interpolation, wherein the result of the linear interpolation is a factor making up the scaling factor.

8. The method of claim 7, wherein the determining the scaling factor further comprises:

calculating a dot product of a forward vector of the local player and the first vector, wherein the dot product is a factor making up the scaling factor.

9. The method of claim 1, wherein a size of the inner cone is dependent on a cone variable, wherein the cone variable is adjustable by the local player, wherein any audio source that is within the inner cone will have their volume presented at the first sound amplitude associated with the inner cone.

10. The method of claim 1, wherein the drawing the inner cone around the local player further comprises:

calculating a dot product of the forward vector of the local player and the vector from the local player to the audio source;

scaling the length of the inner cone as a function of the dot product and a cone variable; and scaling the width of the inner cone as a function of the dot product and a falloff variable.

11. A computing system comprising:

a processor; and a memory storing instructions that, when executed by the processor, configure the system to:

draw an inner cone around a local player;

draw an outer cone around the local player, the outer cone encompassing the inner cone;

dynamically adjust a sound amplitude of an audio source as perceived by the local player based on a placement of the audio source relative to the inner cone and the outer cone, wherein the sound amplitude of the audio source located outside the inner cone and inside the outer cone is a scaled sound amplitude between a first sound amplitude associated with the inner cone and a second sound amplitude for audio sources located outside the outer cone.

12. The computing system of claim 11, wherein a location of the local player is translated by a factor of an offset variable, wherein a larger offset variable locates the local player offset from a center of the inner cone and the outer cone in a direction inverse to a forward vector of the local player.

13. The computing system of claim 11, wherein the instructions configure the system to:

perform a linear interpolation to generate a scaling factor based on the distance of the audio source between a second point and a third point to yield a result of the linear interpolation, wherein the result of the linear interpolation is a factor making up the scaling factor, wherein the scaling factor is used to adjust the sound amplitude of the audio source.

14. The computing system of claim 13, wherein the instructions to determine the scaling factor further comprises:

calculate a dot product of a forward vector of the local player and the first vector, wherein the dot product is a factor making up the scaling factor.

15. The computing system of claim 11, wherein a size of the inner cone is dependent on a cone variable, wherein the cone variable is adjustable by the local player, wherein any audio source that is within the inner cone will have their volume presented at the first sound amplitude associated with the inner cone.

16. The computing system of claim 11, wherein the instructions to draw the inner cone around the local player further comprises:

calculate a dot product of the forward vector of the local player and the vector from the local player to the audio source;

scale the length of the inner cone as a function of the dot product and a cone variable; and scale the width of the inner cone as a function of the dot product and a falloff variable.

17. A non-transitory computer-readable storage medium comprising instructions stored thereon, that when executed by at least one processor, cause the at least one processor to:

draw an inner cone around a local player;

draw an outer cone around the local player, the outer cone encompassing the inner cone;

dynamically adjust a sound amplitude of an audio source as perceived by the local player based on a placement of the audio source relative to the inner cone and the outer cone, wherein the sound amplitude of the audio source located outside the inner cone and inside the outer cone is a scaled sound amplitude between a first sound amplitude associated with the inner cone and a second sound amplitude for audio sources located outside the outer cone.

18. The computer-readable storage medium of claim 17, the instructions further configure the at least one processor to:

determine a first point on the inner cone along a first vector originating at the local player and extending in a direction of the audio source;

compare a distance to the first point on the inner cone with a distance from the local player to the audio source;

when the distance to the first point on the inner cone is less than the distance to the audio source, conclude that the audio source is located outside the inner cone.

19. The computer-readable storage medium of claim 18, wherein the instructions further configure the at least one processor to:

determine a second point on the outer cone that is approximately closest to the audio source;

determine a scaling factor based on a proportional location of the audio source with respect to the second point on the outer cone; and scale the sound amplitude of the audio source between the first sound amplitude and the second sound amplitude proportionately based on the scaling factor.

20. The computer-readable storage medium of claim 19, wherein the instructions further configure the at least one processor to:

determine that the audio source is located inside the outer cone when a distance along a second vector from the center of the inner cone to the audio source is shorter than a distance from the center of the inner cone to the second point on the outer cone.

* * * * *